United States Patent

Davies

Patent Number: 5,966,467
Date of Patent: Oct. 12, 1999

[54] SYSTEM FOR COMPRESSING AND DECOMPRESSING BINARY REPRESENTATIONS OF DITHERED IMAGES

[75] Inventor: Daniel Davies, Palo Alto, Calif.

[73] Assignee: Xerox Corporation, Stamford, Conn.

[21] Appl. No.: 08/928,357

[22] Filed: Sep. 12, 1997

[51] Int. Cl.⁶ .............................. G06T 9/00; G06K 9/46
[52] U.S. Cl. .................... 382/237; 382/243; 382/246; 358/427; 358/429
[58] Field of Search ..................................... 358/455, 456, 358/457, 458, 534, 535, 536, 429, 466; 382/225, 190, 226, 227, 245, 238, 232, 254, 237, 270, 243

[56] References Cited

U.S. PATENT DOCUMENTS

| 5,497,434 | 3/1996 | Wilson | 382/232 |
| 5,703,965 | 12/1997 | Fu et al. | 382/254 |
| 5,751,859 | 5/1998 | Howard | 382/238 |
| 5,754,707 | 5/1998 | Knowlton | 382/254 |

Primary Examiner—Scott Rogers
Assistant Examiner—Chad J Billings
Attorney, Agent, or Firm—Richard B. Domingo

[57] ABSTRACT

A method for compression and decompression of dithered images is disclosed. Logical units (tiles) of the binary representation are classified into equivalence classes which are then compressed. Each equivalence class represents tiles having similar gray levels (i.e. the same number of black pixels), but which may have different sequences of black and white pixels. Each equivalence class has associated with it a predefined set of rendering exemplars. Each of the exemplars has a similar gray level. Upon decompression, each instance of an equivalence class takes on the value of one of the rendering exemplars which is selected pseudo-randomly. This effectively causes the image to be re-dithered so there is no loss of critical image information on decompression

19 Claims, 10 Drawing Sheets

| CLASS NUMBER | CLASS DESCRIPTION | TILE CONFIGURATIONS IN CLASS |
|---|---|---|
| 0 | 3 Isolated White Pixels | 57, 5B, 5D, 5E, 6B, 6D, 6E, 75, 76, 7A, AB, AD, AE, B5, B6, BA, D5, D6, DA, EA |
| 1 | 2 Isolated White Pixels | 5F, 64, 77, 7B, 7D, 7E, AF, B7, BB, BD, BE, D7, DB, DD, DE, EB, ED, EE, F5, F6, FA |
| 2 | 1 White Pixel | 7F, BF, DF, EF, F7, FB, FD, FE |
| 3 | 8 Black Pixels | FF |
| 4 | 8 White Pixels | 00 |
| 5 | 1 Black Pixel | 80, 40, 20, 10, 08, 04, 04, 01 |
| 6 | 2 Isolated Black Pixels | A0, 90, 88, 84, 82, 81, 50, 48, 44, 42, 41, 28, 24, 22, 21, 14, 12, 11, 01, 09, 05 |
| 7 | 3 Isolated Black Pixels | A8, A4, A2, A1, 94, 92, 91, A1, 94, 92, 91, 8A, 89, 85, 54, 52, 51, 4A, 49, 45, 2A, 29, 25, 15 |
| 8 | 2 Black Pixels | C0 |
| 9 | 2 Black Pixels | 60, 30, 18 |
| 10 | 2 Black Pixels | 0C, 06 |
| 11 | 2 Black Pixels | 03 |
| 12 | 3 Black Pixels | E0 |
| 13 | 3 Black Pixels | 70, 38 |
| 14 | 3 Black Pixels | 1C, 0E |
| 15 | 3 Black Pixels | 07 |
| 16 | 3 Black Pixels | D0, C8, C4, C2, C1 |
| 17 | 3 Black Pixels | 68, 64, 62, 61, B0, 34, 32, 31, 98, 58, 1A, 19 |
| 18 | 3 Black Pixels | 8C, 4C, 2C, 0D, 86, 46, 26, 16 |
| 19 | 3 Black Pixels | 83, 43, 23, 13, 0B |
| 20 | 4 Black Pixels | F0 |
| 21 | 4 Black Pixels | 78, 3C |
| 22 | 4 Black Pixels | 1E, 0F |
| 23 | 4 Black Pixels | E8, E4, E2, E1 |
| 24 | 4 Black Pixels | 74, 72, 71, B8, 3A, 39 |
| 25 | 4 Black Pixels | 9C, 5C, 1D, 8E, 4E, 2E |
| 26 | 4 Black Pixels | 87, 47, 27, 17 |
| 27 | 4 Black Pixels | D4, D2, D1, CA, C9, C5 |
| 28 | 4 Black Pixels | 6A, 69, 65, B4, B2, B1, 35, 9A, 99, 5A, 59 |
| 29 | 4 Black Pixels | AC, 8D, 4D, 2D, A6, 96, 56 |
| 30 | 4 Black Pixels | A3, 93, 8B, 53, 4B, 2B |
| 31 | 4 Black Pixels | D8, CC, C6, 63, 33, 1B |
| 32 | 4 Black Pixels | 6C, 66, 36 |
| 33 | 4 Black Pixels | C3 |
| 34 | 4 Black Pixels | AA, A9, A5, 95, 55 |
| 35 | 5 Black Pixels | 1F |
| 36 | 5 Black Pixels | 8F, C7 |
| 37 | 5 Black Pixels | E3, F1 |
| 38 | 5 Black Pixels | F8 |
| 39 | 5 Black Pixels | 2F, 37, 3B, 3D, 3E |
| 40 | 5 Black Pixels | 97, 9B, 9D, 9E, 4F, CB, CD, CE, 67, A7, E5, E6 |
| 41 | 5 Black Pixels | 73, B3, D3, F2, 79, B9, D9, E9 |
| 42 | 5 Black Pixels | 7C, BC, DC, EC, F4 |
| 43 | 6 Black Pixels | 3F |
| 44 | 6 Black Pixels | 9F, CF, E7 |
| 45 | 6 Black Pixels | F3, F9 |
| 46 | 6 Black Pixels | FC |

*FIG. 3*

| | x0 | x1 | x2 | x3 | x4 | x5 | x6 | x7 | x8 | x9 | xA | xB | xC | xD | xE | xF |
|---|---|---|---|---|---|---|---|---|---|---|---|---|---|---|---|---|
| 0x | 4 | 5 | 5 | 11 | 5 | 6 | 10 | 15 | 5 | 6 | 6 | 19 | 10 | 18 | 14 | 22 |
| 1x | 5 | 6 | 6 | 19 | 6 | 7 | 18 | 26 | 9 | 17 | 17 | 31 | 14 | 25 | 22 | 35 |
| 2x | 5 | 6 | 6 | 19 | 6 | 7 | 18 | 26 | 6 | 7 | 7 | 30 | 18 | 29 | 25 | 39 |
| 3x | 9 | 17 | 17 | 31 | 17 | 28 | 32 | 39 | 13 | 24 | 24 | 39 | 21 | 39 | 39 | 43 |
| 4x | 5 | 6 | 6 | 19 | 6 | 7 | 18 | 26 | 6 | 7 | 7 | 30 | 18 | 29 | 25 | 40 |
| 5x | 6 | 7 | 7 | 30 | 7 | 34 | 29 | 0 | 17 | 28 | 28 | 0 | 25 | 0 | 0 | 1 |
| 6x | 9 | 17 | 17 | 31 | 17 | 28 | 32 | 40 | 17 | 28 | 28 | 0 | 32 | 0 | 0 | 1 |
| 7x | 13 | 24 | 24 | 41 | 24 | 0 | 0 | 1 | 21 | 41 | 0 | 1 | 42 | 1 | 1 | 2 |
| 8x | 5 | 6 | 6 | 19 | 6 | 7 | 18 | 26 | 6 | 7 | 7 | 30 | 18 | 29 | 25 | 36 |
| 9x | 6 | 7 | 7 | 30 | 7 | 34 | 29 | 40 | 17 | 28 | 28 | 40 | 25 | 40 | 40 | 44 |
| Ax | 6 | 7 | 7 | 30 | 7 | 34 | 29 | 40 | 7 | 34 | 34 | 0 | 29 | 0 | 0 | 1 |
| Bx | 17 | 28 | 28 | 41 | 28 | 0 | 0 | 1 | 24 | 41 | 0 | 1 | 42 | 1 | 1 | 2 |
| Cx | 8 | 16 | 16 | 33 | 16 | 27 | 31 | 36 | 16 | 27 | 27 | 40 | 31 | 40 | 40 | 44 |
| Dx | 16 | 27 | 27 | 41 | 27 | 0 | 0 | 1 | 31 | 41 | 0 | 1 | 42 | 1 | 1 | 2 |
| Ex | 12 | 23 | 23 | 37 | 23 | 40 | 40 | 44 | 23 | 41 | 0 | 1 | 42 | 1 | 1 | 2 |
| Fx | 20 | 37 | 41 | 45 | 42 | 1 | 1 | 2 | 38 | 45 | 1 | 2 | 46 | 2 | 2 | 3 |

FIG. 5

CLASS NUMBER

| | | | | | | | | |
|---|---|---|---|---|---|---|---|---|
| 0 | 57 | EA | AD | D6 | 6B | D5 | AE | D5 |
| 1 | 5F | EB | BE | D7 | 7E | F5 | BB | EE |
| 2 | EF | F7 | BF | FD | 7F | FB | FE | DF |
| 3 | FF | FF | FF | FF | FF | FF | FF | FF |
| 4 | 00 | 00 | 00 | 00 | 00 | 00 | 00 | 00 |
| 5 | 10 | 08 | 40 | 02 | 80 | 04 | 01 | 20 |
| 6 | A0 | 14 | 41 | 28 | 81 | 0A | 44 | 11 |
| 7 | A8 | 15 | 52 | 29 | 94 | 2A | 51 | 2A |
| 8 | C0 | C0 | C0 | C0 | C0 | C0 | C0 | C0 |
| 9 | 60 | 60 | 18 | 18 | 60 | 60 | 18 | 18 |
| 10 | 06 | 06 | 0C | 0C | 06 | 06 | 0C | 0C |
| 11 | 03 | 03 | 03 | 03 | 03 | 03 | 03 | 03 |
| 12 | E0 | E0 | E0 | E0 | E0 | E0 | E0 | E0 |
| 13 | 70 | 70 | 38 | 38 | 70 | 70 | 38 | 38 |
| 14 | 1C | 1C | 0E | 0E | 1C | 1C | 0E | 0E |
| 15 | 07 | 07 | 07 | 07 | 07 | 07 | 07 | 07 |
| 16 | C4 | D0 | C2 | C8 | C1 | C4 | D0 | C1 |
| 17 | 68 | 62 | 98 | 19 | 34 | B0 | 1A | 31 |
| 18 | 8C | 0D | 46 | 16 | 2C | 8C | 26 | 16 |
| 19 | 83 | 0B | 43 | 13 | 83 | 0B | 43 | 13 |
| 20 | F0 | F0 | F0 | F0 | F0 | F0 | F0 | F0 |
| 21 | 78 | 78 | 3C | 3C | 78 | 78 | 3C | 3C |
| 22 | 1E | 1E | 0F | 0F | 1E | 1E | 0F | 0F |
| 23 | E8 | E2 | E4 | E1 | E8 | E2 | E4 | E1 |
| 24 | 74 | 71 | B8 | 3A | 72 | 74 | 3A | B8 |
| 25 | 9C | 1D | 8E | 2E | 5C | 9C | 4E | 8E |
| 26 | 87 | 17 | 47 | 27 | 87 | 17 | 47 | 27 |
| 27 | D4 | C9 | D1 | CA | D2 | C5 | D1 | CA |
| 28 | 6A | 65 | 5A | 99 | 35 | B2 | 59 | 9A |
| 29 | AC | 2D | A6 | 56 | 4D | AC | 56 | 96 |
| 30 | A3 | 53 | 8B | 2B | A3 | 53 | 93 | 4B |
| 31 | CC | CC | 33 | 33 | CC | CC | 33 | 33 |
| 32 | 6C | 6C | 36 | 36 | 66 | 6C | 36 | 36 |
| 33 | C3 | C3 | C3 | C3 | C3 | C3 | C3 | C3 |
| 34 | AA | 55 | AA | 55 | AA | 55 | AA | 55 |
| 35 | 1F | 1F | 1F | 1F | 1F | 1F | 1F | 1F |
| 36 | 8F | C7 | 8F | C7 | 8F | C7 | 8F | C7 |
| 37 | E3 | F1 | E3 | F1 | E3 | F1 | E3 | F1 |
| 38 | F8 | F8 | F8 | F8 | F8 | F8 | F8 | F8 |
| 39 | 3B | 2F | 3D | 37 | 3E | 3B | 2F | 3E |
| 40 | 97 | 9D | 67 | E6 | CB | 4F | E5 | CE |
| 41 | 73 | F2 | D9 | E9 | D3 | 73 | D9 | E9 |
| 42 | 7C | F4 | BC | EC | 7C | F4 | BC | EC |
| 43 | 3F | 3F | 3F | 3F | 3F | 3F | 3F | 3F |
| 44 | 60 | 60 | 18 | 18 | 60 | 60 | 18 | 18 |
| 45 | F3 | F3 | F9 | F9 | F3 | F3 | F9 | F9 |
| 46 | FC | FC | FC | FC | FC | FC | FC | FC |

*FIG. 10*

SYSTEM FOR COMPRESSING AND DECOMPRESSING BINARY REPRESENTATIONS OF DITHERED IMAGES

FIELD OF THE INVENTION

The present invention is related to the field of data compression, and in particular to LOSSY compression of dithered images.

BACKGROUND OF THE INVENTION

A major stumbling block to common use of digitized images is their size. An 8.5×11 image at 300 dots per inch (dpi) contains roughly 8,000,000 pixels. Even after binarization of a scanned image reduces the number of bits per pixel to 1, this is still 1 megabyte. Compression techniques are typically characterized as LOSSLESS or LOSSY. In LOSSLESS compression, no data is lost in the compression and subsequent decompression. In LOSSY compression, a certain amount of data is lost but it is acceptable since the essence of the compressed data is retained after decompression.

Common LOSSLESS compression techniques for binary images, like CCITT Group 3 or Group 4 or MMR can compress a binary image by factors of 10 to 20. This is still large when compared to the synthetic electronic form used to create a comparable image. Moreover, such compression techniques do not perform well for dithered images. This is because such compression techniques generally depend on the compressor's ability to predict the value of a pixel given neighboring pixels. Dithered images contain many very tiny dots which are intentionally arranged in a pseudo-random pattern. In these images, it is quite difficult to predict the value of a pixel, thus such compression techniques perform poorly.

Vector Quantization is another LOSSY based method for image compression that is well known. A vector quantizer (VQ) is a quantizer that maps k-dimensional input vectors into one of a finite set of k-dimensional reproduction vectors, or codewords. For image compression the input vector is a fixed grouping of pixels. A VQ can be divided into two parts: an encoder and a decoder. The encoder maps the input vector into a binary code representing the index of the selected reproduction vector, and the decoder maps the binary code into the selected reproduction vector. The reproduction vector becomes the decompressed value of the input vector.

Typically the decoder operates using a simple lookup table. To obtain acceptable results upon decompression, the number of reproduction vectors, and resulting lookup table, can be quite large. As the lookup table may be part of the compressed data stream, a large lookup table is undesirable.

Vector quantization is conceptually similar to a known method for performing compression on text images by grouping the symbols found into equivalence classes. In this method, symbols are extracted from the binary image and matched to templates for one or more equivalence classes. In order to get good compression, a classifier should operate with a small number of classes.

An example of image compression based on symbol matching is described in co-pending U.S. patent application Ser. No. 08/575,305 filed Dec. 20, 1995, entitled "Classification Of Scanned Symbols Into Equivalence Classes". A further example of image compression based on symbol matching is described in U.S. Pat. No. 5,303,313 entitled "Method and Apparatus For Compression Of Images", Mark et al., issued Apr. 12, 1994 (the '313 patent). In the '313 patent an image is "precompressed" prior to symbol matching. The '313 patent describes using run-length encoding for such precompression. Symbols are extracted from the run-length representation. A voting scheme is used in conjunction with a plurality of similarity tests to improve symbol matching accuracy. The '313 patent further discloses a template composition scheme wherein the template may be modified based on symbol matches.

However, the aforementioned symbol based compression techniques do not compress particularly well with respect to pictorial images, in particular dithered images. This is because the pseudo random patterns typically causes a high number of equivalence classes to be created and because a very large number of symbols must be classified (often each dot would be interpreted as a separate symbol).

SUMMARY OF THE INVENTION

A system for compressing and decompressing binary representations of dithered images is disclosed. The currently preferred embodiment of the present invention provides a LOSSY method for compressing dithered images. In LOSSY compression, some of the original image data is lost. It has been determined that for dithered images such as halftoned and error-diffused images an exact reproduction of the original image may not be necessary for acceptable results. The present invention incorporates the idea that maintaining the exact position of edges in a dithered image is not as important as maintaining the gray levels. This is because dithered images contain dots which are intentionally arranged in a pseudo random pattern. Through arrangement of pixels in such a pseudo random pattern, undesirable artifacts such as streaks or lines, are avoided.

The compression method of the present invention is generally comprised of the steps of defining a plurality of equivalence classes for tiles of multi-pixel binary encoded data contained in said binary encoded image, wherein tiles are of a first predetermined organization of binary data and each equivalence class has defined and associated therewith one or more rendering exemplars; classifying each tile in said binary encoded image into an equivalence class and encoding the equivalence classes by scanline into sequences of literal elements and copy elements, wherein literal elements direct decompression to find the equivalence class in the compressed data stream and copy elements direct decompression to find the equivalence class in the immediately preceding decompressed scanline. On decompression, the sequence of literal elements and copy elements are decoded into their respective equivalence classes a scanline at a time and then a corresponding rendering exemplar is selected for each equivalence class.

BRIEF DESCRIPTION OF THE DRAWINGS

FIG. 3 is a table containing the values of the encoded equivalence classes as may be utilized in the currently preferred embodiment of the present invention.

FIG. 5 is a table used for identifying which equivalence class a tile belongs to in the currently preferred embodiment of the present invention.

FIG. 10 is a table containing the values of the rendering exemplars of the currently preferred embodiment of the present invention.

DETAILED DESCRIPTION OF THE INVENTION

A system for compressing and decompressing binary representations of continuous tone images is disclosed. The present invention may be used in various applications requiring or benefiting from data compression. Such applications may be found as part of an overall image processing system or as stand-alone applications. The currently preferred embodiment of the present invention is implemented as software running on a computer based system. The software is written in the C programming language. The present invention has been preferably implemented for compression of pictorial image data.

The following terms take on the accompanying meaning in this description:

Image refers to the markings on or appearance of a medium.

Image data refers to a representation of an image which may be used for recreating the image.

Pictorial image refers to non-textual and non line art markings on a medium.

Tile or Tiles refers to a logical organization of pixels as the primitive object which is classified.

An equivalence class is a set of tiles found in an image that can be substituted for one another without changing the appearance of an image in an objectionable way.

The rendering exemplars of the equivalence class are the set of pixel configurations for the equivalence class, one or more of which will be substituted for a member of the equivalence class when the image is decompressed or otherwise recreated. The collection of rendering exemplars for the equivalence classes are referred to as a rendering dictionary.

Copy element refers to a data element in a compressed data stream which instructs decompression to obtain equivalence class values from the preceding decoded scanline.

Literal element refers to a data element in a compressed data stream which instructs decompression to obtain equivalence class values in the element itself.

Compressed Data Stream refers to a compressed representation of an image comprised of copy and literal elements and possibly a corresponding rendering dictionary.

The currently preferred embodiment of the present invention provides a LOSSY method for compressing dithered images. In LOSSY compression, a certain amount of the data is altered during compression and subsequent decompression. It has been determined that for both halftoned and error-diffused images an exact reproduction of a original image is not necessary for acceptable results. The present invention incorporates the idea that maintaining the exact position of edges in a dithered image is not as important as maintaining the gray levels. This is because dithered images contain dots which are intentionally arranged in a pseudo random pattern. Through arrangement in such a pseudo random pattern, undesirable artifacts such as streaks or lines, are avoided.

Overview

Figure 1:
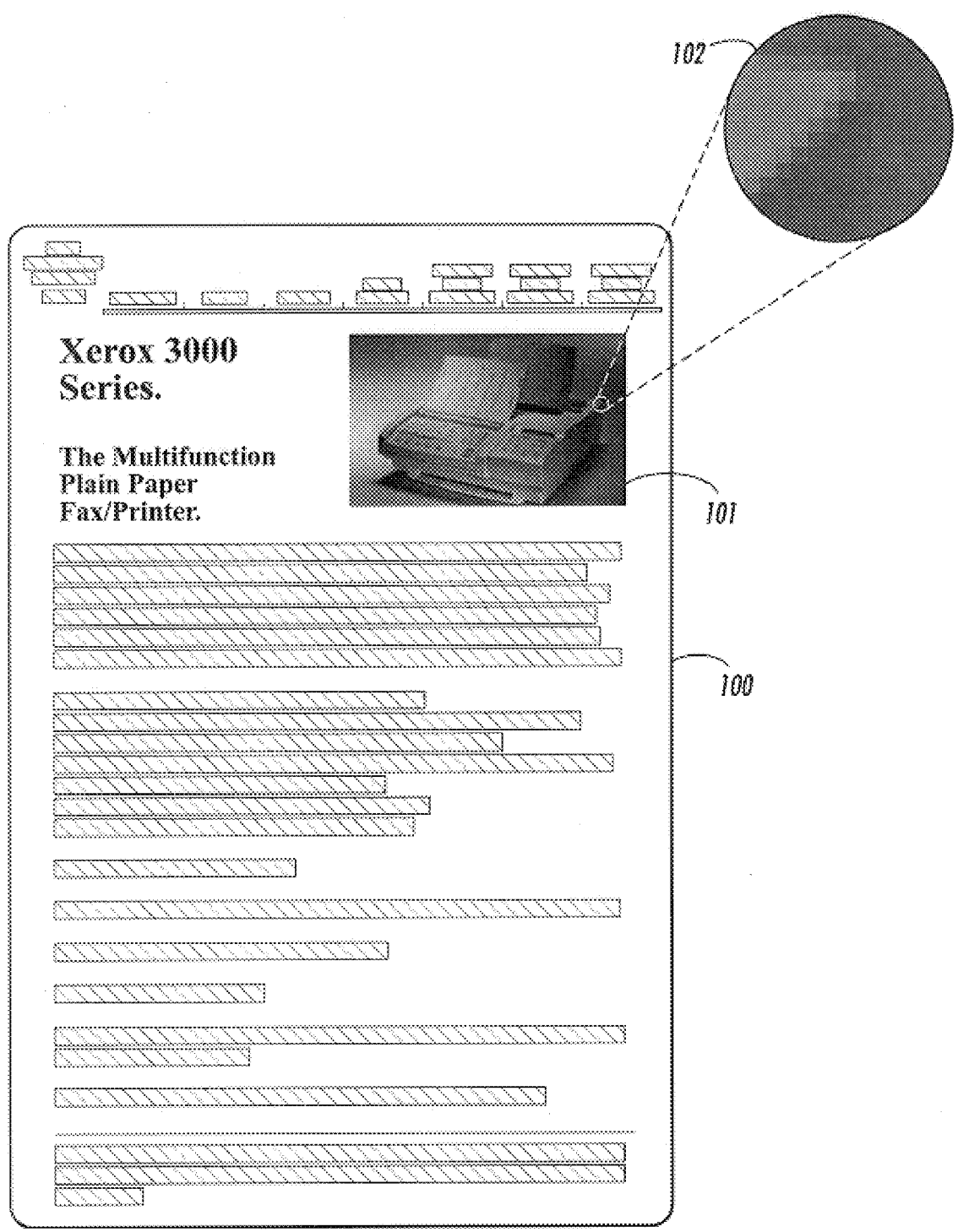
FIG. 1 is an illustration of a dithered image which may be compressed using the LOSSY compression method of the currently preferred embodiment of the present invention.

A dithered pictorial image which may be compressed using the method of present invention is illustrated in FIG. 1. Referring to FIG. 1, a document image 100 has both text and a pictorial areas. The pictorial area 101 is indicated and shown in a magnified view 102. As described above, the magnified view 102 shows the pictorial area 101 being comprised of dots in a random pattern.

It should be noted that the text area may also be compressed using the method of the present invention, but the resulting decompressed image may lose too much information (i.e. it will look bad). Various techniques are known to separate text and pictorial areas from a scanned image and applying different compression schemes on each. The method of the present invention may operate in such an implementation.

The present invention is accomplished by first defining a set of equivalence classes for a logical unit, i.e. a tile, of the image according to a set of predetermined rules. When compressing, each tile in the image is assigned to an equivalence class. Each tile in the equivalence class will have the same gray level, but may have different sequences of black and white pixels.

Further associated with each equivalence class is a set of rendering exemplars. Each rendering exemplar will produce the same gray level (i.e. they have the same number of black pixels). Upon decompression, the set of equivalence classes representing the image are decoded. For each equivalence class a rendering exemplar is selected from the corresponding set based on some pseudo random criteria (e.g. the scanline).

Another way to characterize the present invention is view it as vector quantization with a reduced size rendering dictionary and wherein the pictorial image is re-dithered on decompression.

Figure 2:
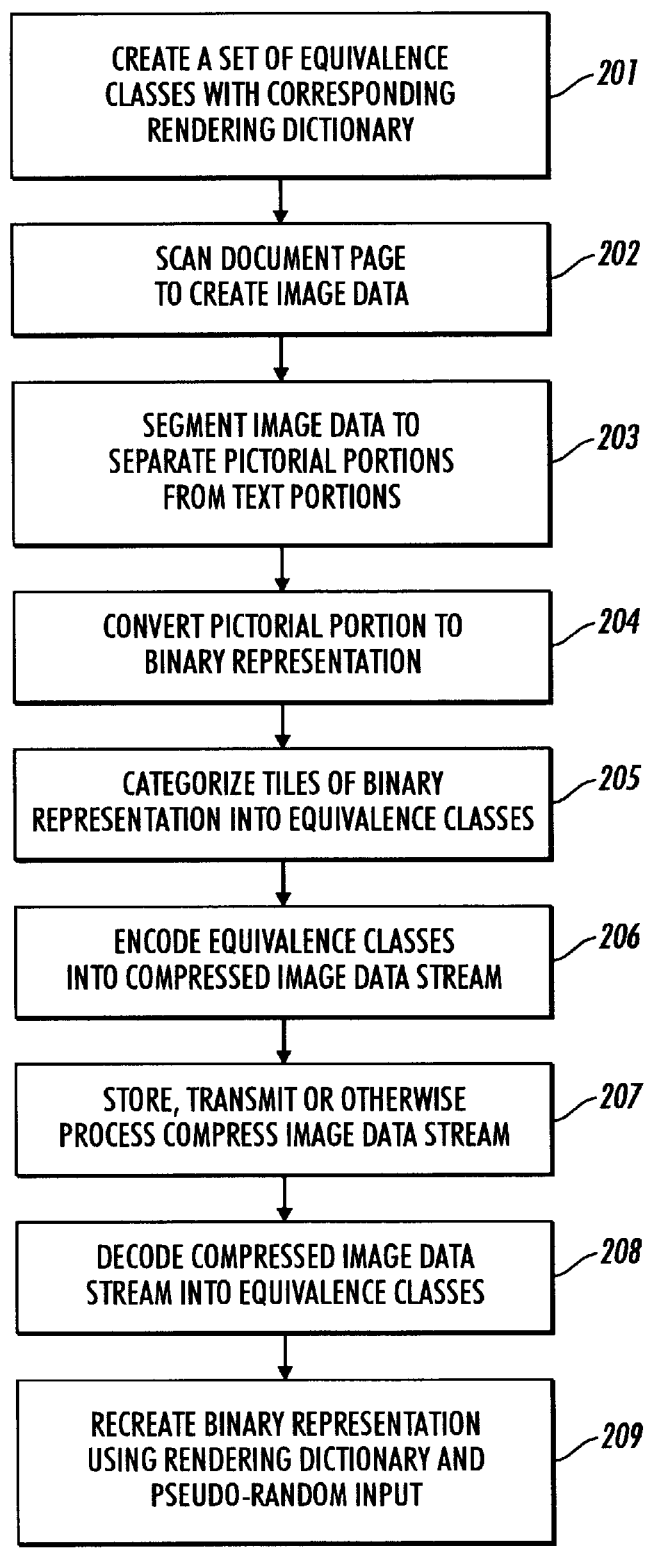
FIG. 2 is a flowchart describing the general steps for the data compression and decompression method of the currently preferred embodiment of the present invention.

FIG. 2 is a flowchart which describes the general steps of the method of the present invention. First, a set of equivalence classes and corresponding rendering dictionary are created for a particular tile configuration, step 201. In order for a document image to be compressed, a document is scanned to create image data, step 202. The image data is typically a bit-mapped representation of the image. The pictorial portions of the image data are segmented from the text portions of the image data, step 203. It is the pictorial portion that is processed by the present invention. It should be noted that preferably any text contained in the pictorial portion also be segmented out. Further, the entire image may be comprised of pictorial data. The pictorial portion of the image data is then converted into a binary representation to create a representation where each pixel is represented by a single bit, step 204. A multi-level image may typically have a pixel represented by a multi-bit data operand. In order to convert it into a single bit value, a dithering operation is typically performed. This dithering operation provides a smooth and visually pleasing transition between different areas of the image.

Each of the tiles in the binary representation are then extracted and categorized into a particular equivalence class, step 205. An equivalence class identifier is provided for each tile. In the currently preferred embodiment, a tile is a 1 pixel high and 8 pixel wide block. It is assumed that the equivalence classes are predefined in a manner which corresponds to the tile size. The stream of equivalence class identifiers are then encoded, step 206. The steps 205 and 206 as described herein are in general terms. The preferred manner in which steps 205 and 206 are implemented is described in greater detail below. However, it should be noted that other known techniques may be utilized and which would not cause departure from the spirit and scope of the present invention. In any event, the encoding step 206 results in a compressed image data stream. The compressed data stream is comprised of a sequence of copy elements (for instructing a decompression process to find each equivalence class from the corresponding position(s) in the preceding decoded scanline) and literal elements (for instructing the decompression process to derive each equivalence class directly from the compressed data stream). Each copy and literal element will represent some number of tiles extracted from the image data. Depending on the implementation of the present invention, the compressed image data stream may or may not include the rendering dictionary.

It should be noted that in the currently preferred embodiment the encoding of the equivalence class representations is made immediately after the tiles of a scanline have been converted into equivalence classes. This may in fact minimize the amount of internal memory required for performing the compression (e.g. by limiting it to two scanline buffers). However, it would be possible to perform the encoding after all the equivalence classes have been identified for the image, which may enable the use of alternative encoding schemes.

The compressed data stream may then be stored or transmitted, depending on the purpose for the compressed data stream, step 207.

When the compressed data stream is to be decompressed, the equivalence class identifier encoding is decoded in order to obtain the equivalence class representation, step 208. A binary representation of the image is created using the equivalence class representations, the rendering dictionary and some pseudo random input such as the number of the current scanline, step 209. Note that this binary representation would typically be different from the originally created binary representation in step 204 since for any particular tile, the specific rendering exemplar used may have a different pixel configuration of the original tile. This in effect causes the image to be re-dithered.

Equivalence Classes

In the currently preferred embodiment, the image is broken into tiles 1 pixel tall and 8 pixels wide. Utilization of other tile sizes and dimensions are possible and would not depart from the spirit and scope of the present invention. The contents of each tile is then classified into one of a plurality of predefined equivalence classes. The equivalence classes are defined so that upon decompression, re-dithering may occur.

In order to achieve significant compression, it is desirable to minimize the number of equivalence classes. For a tile size of 1×8 binary values, there could theoretically be a maximum of 256 equivalence classes. An efficient method of defining a minimal number of equivalence classes is needed. In the currently preferred embodiment there are 47 predefined equivalence classes. This number was experimentally determined to provide acceptable visual results on decompression. However, utilization of a different number of equivalence classes is possible and would clearly be within the spirit and scope of the present invention.

The general rules used for creating the equivalence classes are as follows:

1. All members of an equivalence class should have the same number of black pixels.
2. An isolated black pixel can move anywhere inside a tile and still be in the same equivalence class.
3. An isolated block of 2 black pixels can move left or right two pixel positions within a tile while remaining in the same equivalence class.
4. An isolated block of 3 or 4 black pixels can move left or right by 1 pixel position within a tile while remaining in the same equivalence class.
5. A block of 2 or more black pixels attached to the left or right edge of a tile must stay attached to that edge.
6. If there are more black pixels than white pixels in a tile, all the above rules are applied to groups of isolated white pixels instead of applying them to groups of isolated black pixels. For example, this means that the equivalence classes that contain 5 black pixels can be derived from the equivalence classes that contain 3 black pixels by simply inverting all the pixels in each tile of each class.

The equivalence classes of the currently preferred embodiment are illustrated in the table of FIG. 3. In reviewing the table of FIG. 3 it should be noted that the tile configurations are illustrated in their hex rather than the binary values of the actual tile. The hex/binary equivalents are: 0=0000, 1=0001, 2=0010, 3=0010, 4=0100, 5=0101, 6=0110, 7=0111, 8=1000, 9=1001, A=1010, B=1011, C=1100, D=1101, E=1110 and F=1111. It should be noted that in FIG. 3, the classes 0–7 may appear to be out of order. It has been determined that the ordering of classes in this manner may possibly lead to greater compression since there are many transitions amongst this group of classes and special coding may be utilized. However, utilization of different ordering of the classes would be within the spirit and scope of the present invention.

Image Compression

Figure 4:
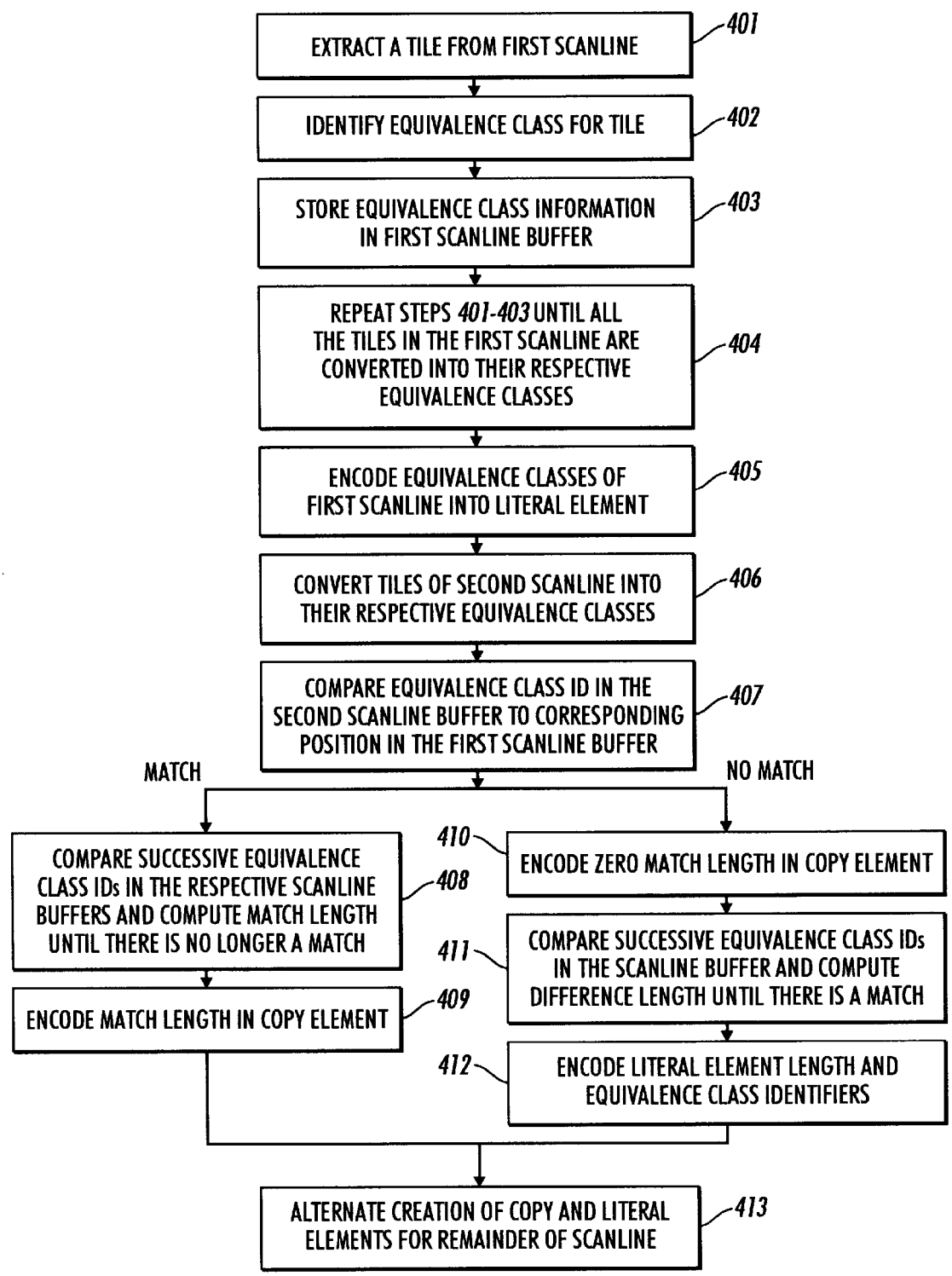
FIG. 4 is a flowchart illustrating the steps for compressing a scanline using the data compression method of the currently preferred embodiment of the present invention.

In the currently preferred embodiment, images are converted to their equivalence class representation and then encoded a scanline at a time. FIG. 4 is a flowchart illustrating the steps for compressing a scanline in the currently preferred embodiment of the present invention and correspond to steps 205–206 of FIG. 2. Referring to FIG. 4, a tile in a first scanline is extracted from the image, step 401. This extraction is merely taking a grouping of 8 pixels, or as they are represented by binary data, a byte of data in the scanline. The equivalence class in which the tile belongs is identified, step 402. The currently preferred embodiment uses the table in FIG. 5 to map a tile to its equivalence class. Referring to FIG. 5, the column entry represents the 4 left most bits and the row entry represents the 4 right most bits of a tile. Equivalence class identification is then merely a table-look up.

The equivalence class information is then stored in a first scanline buffer, step 403. As will become apparent in the description below, the first scanline buffer will become a "reference" buffer for encoding the second scanline. The steps 401–403 are repeated until all the tiles in the first scanline are converted into their respective equivalence classes, step 404. The equivalence classes of the first scanline are then encoded into a literal element, step 405. In this case it will be an encoding where the length is the length of the scanline followed by an encoding by equivalence class identifiers. It should also be noted that for the first scanline, the first element is a copy element having a zero length. Further, in the currently preferred embodiment a Huffman encoding of literal elements and lengths is performed. The Huffman codes utilized are based on experimentation and observation of the frequency patterns of equivalence classes. Utilization of Huffman codes in this manner is known in the art and the rules of the currently preferred embodiment are described in Appendix A.

A second scanline is then converted into a set of equivalence classes using basically the same steps as described in steps 401–403 except that the equivalence classes are stored in a second scanline buffer, step 406. Encoding of the equivalence classes henceforth occurs differently since there is now a previous encoded scanline to compare to. It should be noted that encoding for the subsequent scanlines always results in a sequence of alternating copy and literal elements. First a tile's equivalence class of the second scanline buffer is compared to the corresponding position in the first scanline buffer, step 407. If there is a match, the successive equivalence class IDs are compared from the respective buffers and a match length calculated until there is no longer a match, step 408. A copy elements match length is then encoded, step 409. Copy elements are also Huffman coded.

If there was no match in step 407, a zero match length is encoded in the copy element, step 410. Next, the successive equivalence class definitions in the second scanline buffer are compared to determine if they are in the same equivalence class and a length calculated until a matching pair of equivalence classes is encountered, step 411. A length for a literal element is then encoded along with the equivalence class identifiers represented by the literal element, step 412. The alternating creation of copy elements and literal elements is then repeated for the remainder of the scanline, step 413.

For the next (e.g. third) scanline, the second scanline buffer is used as the "reference" buffer, while the first scanline buffer is used as the buffer into which equivalence classes are written. This switching of the use of the first and second scanline buffers as the "reference" buffer continues for the entire image.

Figure 6:
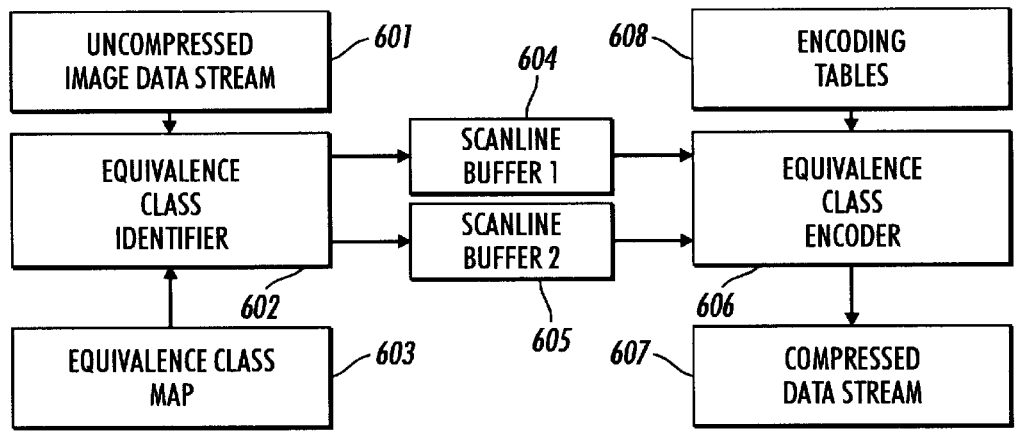
FIG. 6 is a block diagram showing the functional components of a compression system for practicing the compression method of FIG. 4.

It is noted that this technique of using a previously encoded scanline as a reference buffer is a well known technique used for example in CCITT Group 4 compression. However, other types of encodings for a stream of equivalence class identifiers could be utilized such as a lempel-ziv technique, without departing from the spirit and scope of the present invention. FIG. 6 is a block diagram illustrating the functional components for performing the compression method of FIG. 4. Referring to FIG. 6, an Uncompressed Image Data Stream 601 is coupled to an Equivalence class identifier 602. The Uncompressed Image Data Stream 601 contains the original uncompressed scanline data. Further coupled to the equivalence class identifier 602 is an equivalence class map 603. The equivalence class map 603 may be stored in a conventional storage device and will contain the information as shown in FIG. 5. The output of the equivalence class identifier 602 switches between scanline buffers 604 and 605. As noted above, since encoding of the equivalence classes depends on the equivalence classes of the previous scanline, a copy of the previous scanline is maintained. Each of the scanline buffers 604 and 605 is further coupled to equivalence class encoder 606. The equivalence class encoder 606 compares the contents of the scanline buffers and encodes them into copy or literal elements as appropriate which are stored as a Compressed Data Stream 607. Further coupled to the equivalence class encoder is encoding tables 608. The encoding tables 608 contain the information needed to perform the Huffman encoding on the copy and literal elements.

Figure 7:
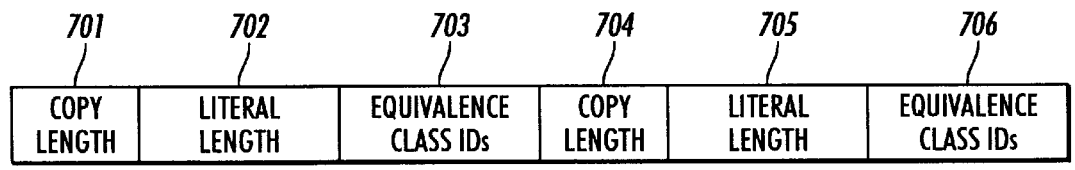
FIG. 7 is a block diagram illustrating a compressed scanline data stream as may be utilized in the currently preferred embodiment of the present invention.

FIG. 7 is a block diagram illustrating a compressed scanline data stream. Referring to FIG. 7, as noted above for a compressed scanline the first element is always a copy element, here copy element 701. The information contained in the copy element 701 is a match length. The next element, if one exists, will be a literal element 702. Note that no literal element would be encoded if the equivalence class identifiers for the current scanline and the reference scanline were identical. The literal element contains a length along with a corresponding number of equivalence class identifiers 703. If there is a next element it will be a copy element 704, again comprising a match length as the primary information. If the scanline is not completed, this will again be followed by a literal element 705 and equivalence class identifiers 706. In practice, a copy element is merely an encoding of the match count while a literal element is an encoding of a length followed by the corresponding number of equivalence class encodings.

As noted above compression is further achieved through a Huffman encoding of the length information for the literal and copy elements of the created compressed data stream. It should be noted that the codes for the lengths of literal and copy elements are different. This is because the observed frequency characteristics for the two types of elements differ. A description of the coding of length information for literal and copy elements is provided in Appendix A.

Further, the currently preferred embodiment contains other special encodings for the lengths for copy elements. A code is provided for indicating copying to the end of scanline. Other codes are provided to indicate copying to a next (or next after the next), key point. A key point is defined as a point in the previously encoded scanline where a transition was made from encoding of a copy element to encoding of a literal element. Note that this type of encoding is also done in CCITT Group 4 encoding, so no further description of this type of encoding is deemed necessary.

Decompression

As described above, each equivalence class is represented by a plurality of rendering exemplars. In the currently preferred embodiment, each equivalence class is represented by a set of 8 rendering exemplars. Note that in some instances the 8 rendering exemplars may not all be unique (e.g. the case where an equivalence class only represents only a single tile configuration). However, for the most part, the 8 rendering exemplars were chosen because they present a pleasing visual appearance when used to re-dither the equivalence class on decoding.

Figure 8:
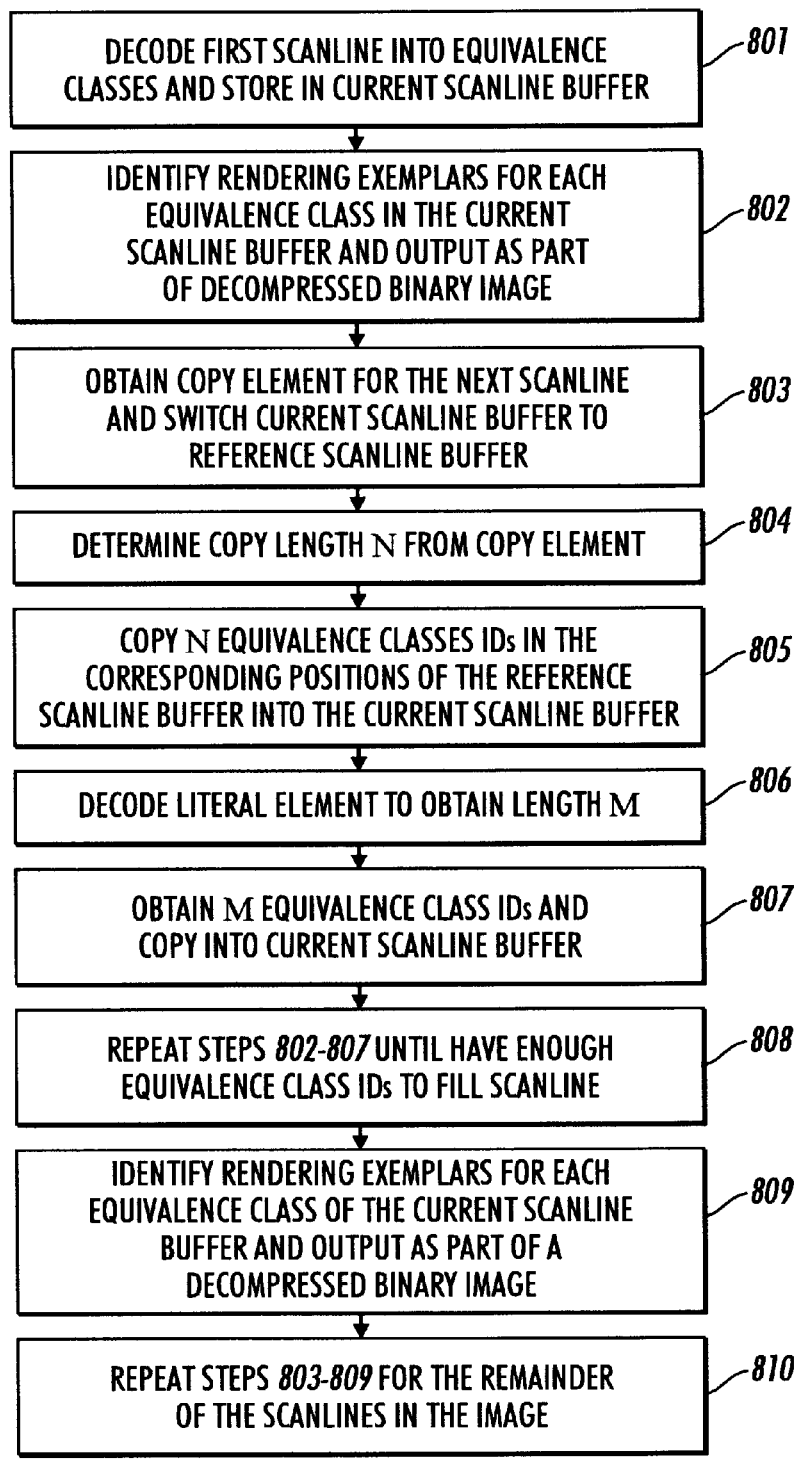
FIG. 8 is a flowchart illustrating the steps for decompressing a compressed data stream using the decompression method of the currently preferred embodiment of the present invention.

As described above, in the currently preferred embodiment, scanline encoding/compression is performed based on the content of the immediately previous scanline. A similar process is performed in decoding/decompression. FIG. 8 is a flowchart describing the steps for decompression. Referring to FIG. 8, a first scanline is decoded to create a decoded scanline in a current scanline buffer, step 801. The decoded scanline is comprised of a scanline of equivalence class identifiers. In the currently preferred embodiment, information indicating the length of a scanline is obtained from descriptive information which describes the image. For example, a document image encoded in the Tagged Information File Format (TIFF) will include a tag having image width information from which scanline information may be derived. So the decoding occurs until the determined number of equivalence class identifiers have been decoded. Rendering exemplars for each of the equivalence classes are then identified and output as a decompressed scanline, step 802. In any event, once a scanline is decoded and equivalence class exemplars identified, the "current" scanline buffer becomes a "reference scanline buffer" and the next scanline becomes the current scanline and is decoded based in part on the decoded equivalence class identifiers found in the reference scanline buffer. The process begins by first obtaining a copy element for the current scanline and switching the current scanline buffer to a reference scanline buffer, step 803. As described above, in the currently preferred embodiment, this first element will always be a copy element, or more precisely it is presumed to be a count (which may be zero). The copy element is decoded to obtain a length M, step 804. It should be noted that as described above, the length M may represent a key point in the reference scanline. In any event, the number of equivalence class IDs represented by Length M in the corresponding positions in the reference scanline buffer are then copied to the current scanline buffer, step 805. Note that if length M is zero, then no equivalence class IDs are copied.

The next literal element, if one exists, is decoded to determine a length N, step 806. The N equivalence class IDs included in the literal element are then copied into the current scanline buffer, step 807. The decoding of the current scanline continues per steps 803–807 continues until enough equivalence class IDs have been decoded to fill the scanline, step 808. When the decoding of the current scanline is completed, the rendering exemplars for the various equivalence classes in the current scanline are obtained and output as a decoded scanline, step 809.

The steps 803–809 are then repeated for the remainder of the scanlines in the image, step 810.

Figure 9:
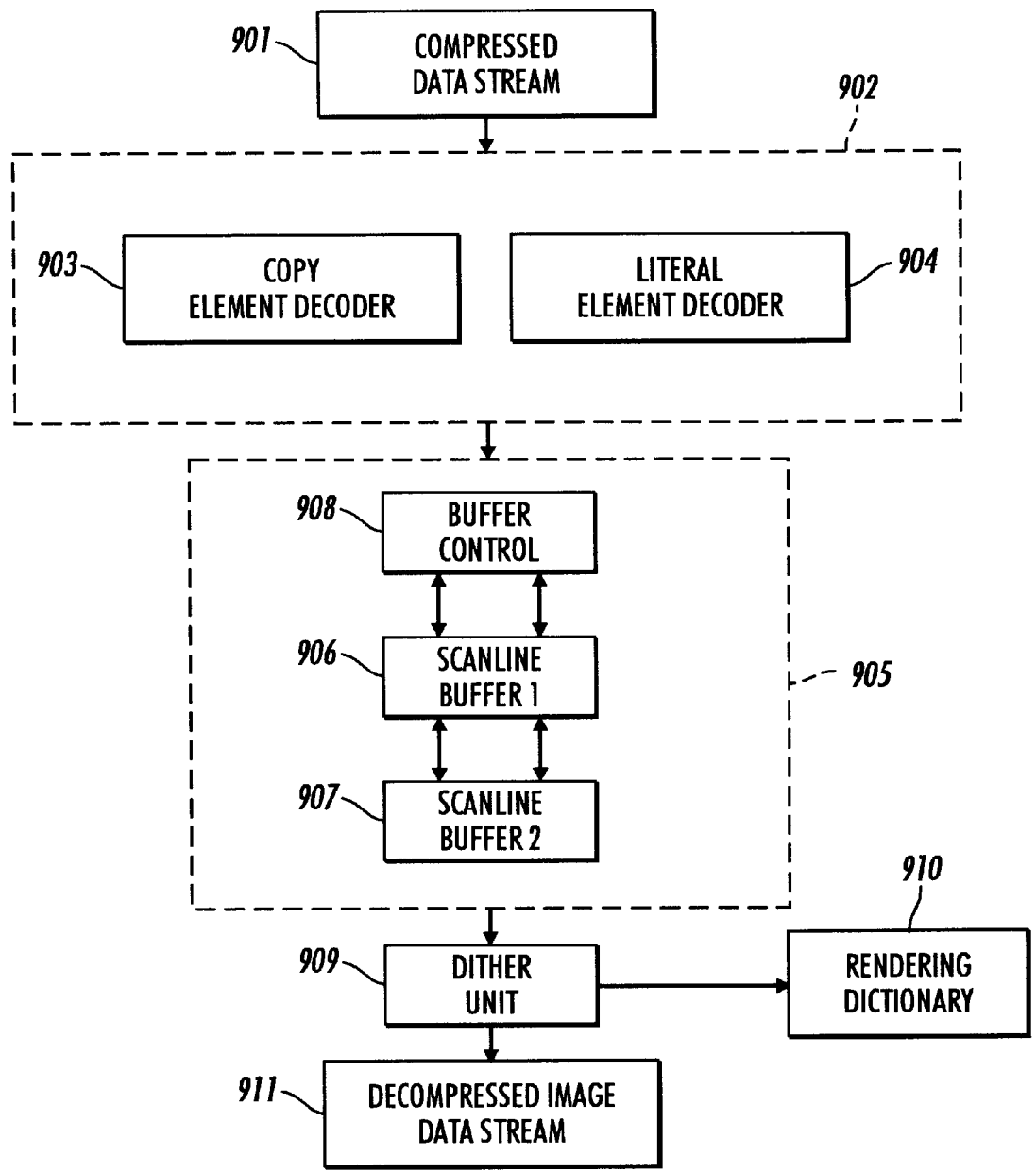
FIG. 9 is a block diagram showing the functional components of a decompression system for practicing the compression method of FIG. 8.

FIG. 9 is a block diagram of the functional components of a decompression system for performing the decompression described in the flowchart of FIG. 8. Compressed Data stream 901 is input to an element decoder unit 902. The element decoder unit 902 is comprised of a copy element decoder 903 and a literal element decoder 904. The copy element decoder 903 will decode the match length information for copy elements. The literal element decoder 904 will decode the count information as well the corresponding number of equivalence class IDs. Each of the copy element decoder 903 and the literal element decoder 904 is coupled to a buffer unit 905. The buffer unit 905 is comprised of scanline buffer 1 906 and scanline buffer 2 907. The buffer unit 905 further contains buffer control 908 which manages access to the buffers (e.g. determines which is the reference buffer used by copy element decoder, when the buffer can be output, etc.)

The copy element decoder 903 will send control information to the buffer unit 905 for controlling copying of equivalence class IDs between scanline buffer 1 906 and scanline buffer 2 907. The literal element 904 will send decoded equivalence class IDs to the buffer unit 905 for storing in one of scanline buffer 1 906 or scanline buffer 2 907.

Further coupled to the buffer unit 905 to receive scanlines of decoded equivalence class IDs is dither unit 909. The dither unit 909 is used for determining the rendering exemplar to be used for rendering the corresponding equivalence class. Coupled to the dither unit 909 is a rendering dictionary 910. The rendering dictionary contains the sets of rendering exemplars used for each equivalence class. The output of the dither unit 909 is the decompressed image data stream 911.

Rendering Exemplars

FIG. 10 is a table illustrating the rendering exemplars for the equivalence classes of the currently preferred embodiment of the present invention. The table of FIG. 10 may also be considered the rendering dictionary for the equivalence classes and would be contained in the rendering dictionary 910 of FIG. 9. The rendering dictionary enables the decompressed pictorial image to remain dithered (or to be re-dithered). The creation of the in rendering exemplars is based in part on the number of tile configurations and an estimate of the aesthetic effect obtained by filling a region with a single equivalence class so as to create no streaks or bars. Note that other sets of rendering exemplars may be used, so long as an acceptable aesthetic effect is maintained, without departing from the spirit and scope of the present invention.

In the currently preferred embodiment, the rendering exemplar used is determined by the selecting the exemplar corresponding to the value of the scanline number being processed modulo the number of exemplars, e.g. 8. So for example, for the 25th scanline, 25 modulo 8, i.e. 1, would cause the second exemplar in the corresponding set to be used. Note that the sets are numbered 0–7. It should be noted that other methods could be used for selecting the exemplar (e.g. a completely random scheme), and would not cause departure from the spirit and scope of the present invention.

Figure 11:
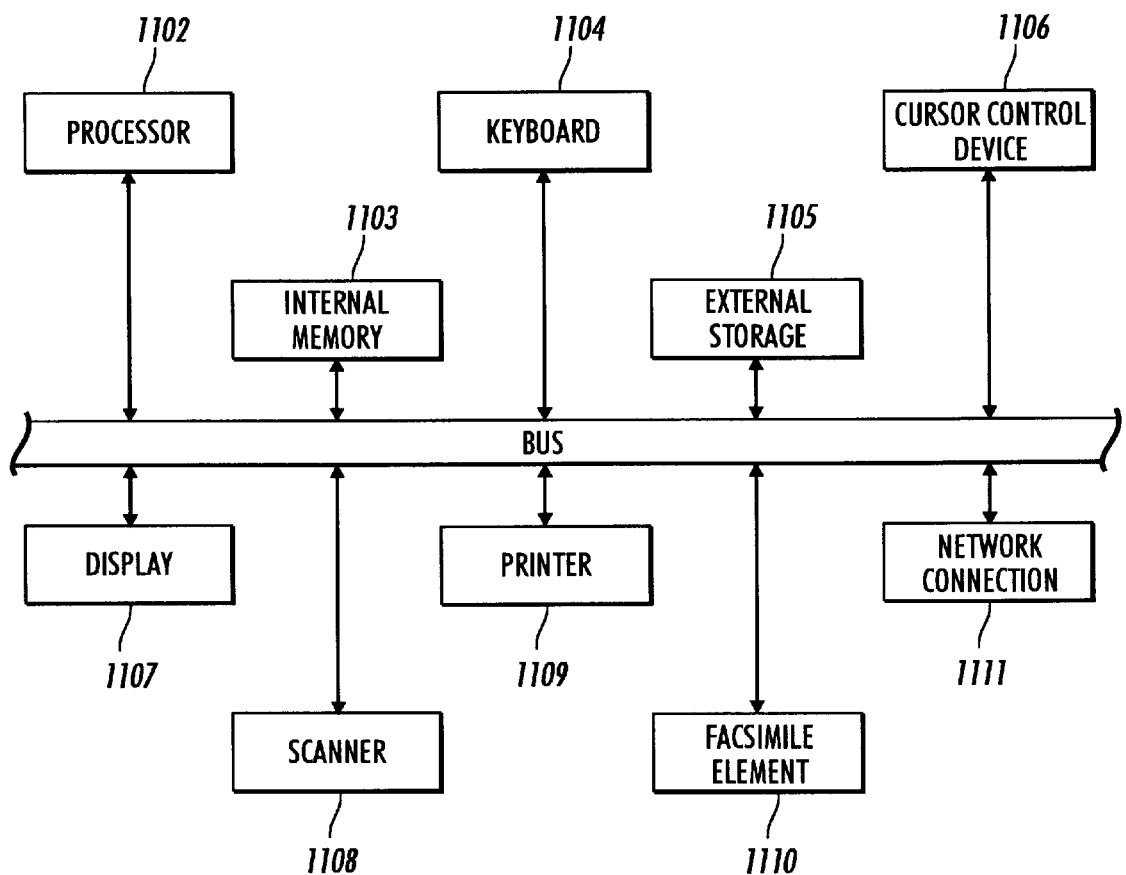
FIG. 11 is an illustration of a computer based system upon which the currently preferred embodiment of the present invention may be utilized.

Overview of a Computer Based System In the Currently Preferred Embodiment of the Present Invention The computer based system on which the currently preferred embodiment of the present invention may be used is described with reference to FIG. 11. Referring to FIG. 11, the computer based system is comprised of a plurality of components coupled via a bus 1101. The bus 1101 illustrated here is simplified in order not to obscure the present invention. The bus 1101 may consist of a plurality of parallel buses (e.g. address, data and status buses) as well as a hierarchy of buses (e.g. a processor bus, a local bus and an I/O bus). In any event, the computer system is further comprised of a processor 1102 for executing instructions provided via bus 1101 from Internal memory 1103 (note that the Internal memory 1103 is typically a combination of Random Access or Read Only Memories). Such instructions are those that are preferably implemented in software for carrying out the processing steps outlined above in the flowcharts of FIGS. 2, 4 and 8. The processor 1102 and Internal memory 1103 may be discrete components or a single integrated device such as an Application Specification Integrated Circuit (ASIC) chip. Further the combination of processor 1102 and Internal Memory 1103 comprise circuitry for performing the functionality of the present invention so that the currently preferred embodiment of the present invention could be implemented on a single ASIC or other integrated circuit chip.

Also coupled to the bus 1101 are a keyboard 1104 for entering alphanumeric input, external storage 1105 for storing data such as a compressed text image data file, a cursor control device 1106 for manipulating a cursor, and a display 1107 for displaying visual output. The keyboard 1104 would typically be a standard QWERTY keyboard but may also be a telephone like keypad. The external storage 1105 may be fixed or removable magnetic or optical disk drive. The cursor control device 1106 will typically have a button or switch associated with it to which the performance of certain functions can be programmed. Further coupled to the bus 1101 is a scanner 1108. The scanner 1108 provides a means for creating a bitmapped representation of a medium (i.e. a scanned document image).

Further elements that could typically be coupled to the bus 1101 would include printer 1109, facsimile element 1110 and network connection 1111. The printer 1109 could be used to print the bitmapped representation. The facsimile element 1110 may contain an element used to transmit a image data that has been compressed using the present invention. Alternatively, the facsimile element 1110 could include an element for decompression of a document image compressed using the present invention. The network connection 1111 would be used to receive and/or transmit data containing image data. Thus, the image data utilized by the present invention may be obtained through a scanning process, via a received fax or over a network.

Thus, a LOSSY method and apparatus for compressing and decompressing dithered images is disclosed. While the present invention is described with respect to a preferred embodiment, it would be apparent to one skilled in the art to practice the present invention with other alternative embodiments. Such alternate embodiments would not cause departure from the spirit and scope of the present invention.

APPENDIX A

```
/******************ENCODING TABLES******************/
/* Here's the table used to encode the lengths of literal strings.
 * These are encoded as a length followed by the indicated number
 * of codes for equivalence classes. We actually encode length-1
 * since the shortest literal length is 1.
 */
/* These are masks used to select the useful bits following the
 * prefixes in the medium, long and very long length codes.
 */
#define cLDMediumLengthBitMask 0x3F
#define cLDLongLengthBitMask 0x7F
#define cLDVeryLongLengthDataBitMask 0x7F
#define cLDVeryLongLengthFlagBitMask 0x80
/* These are the indices into the encoding table for special codes
 * (see table definition below).
 */
#define cLDShortLitLength 64
#define cLDMediumLitLength 128
#define cLDLongLitLength 256
#define cLDMediumLitLengthBits 6
#define cLDLongLitLengthBits 7
#define cLDVeryLongLitLengthBits 8
#define cLDMediumLitLenPrefix 65
#define cLDLongLitLenPrefix 66
#define cLDVeryLongLitLenPrefix 67
#define cLDLitLenToEOL 68
#ifdef _NEED_LITERAL_LENGTH_CODES_
/* REMEMBER, read these bits from right to left! */
static mmrTableEntry IdcLiteralLengthCodes[69] =
{
    { 0x0000, 0 },   /* dummy so we can index with length instead of
                      * length-1         */
    { 0x0001, 1 },   /*                  1; decode as 1 */
    { 0x0002, 3 },   /*                010; decode as 2 */
    { 0x0006, 3 },   /*                110; decode as 3 */
    { 0x0004, 4 },   /*               0100; decode as 4 */
    { 0x000C, 4 },   /*               1100; decode as 5 */
    { 0x0018, 5 },   /*              1 1000; decode as 6 */
    { 0x0008, 6 },   /*             00 1000; decode as 7 */
    { 0x0028, 6 },   /*             10 1000; decode as 8 */
    { 0x0010, 7 },   /*            001 0000; decode as 9 */
```

APPENDIX A-continued

```
    { 0x0050, 7 },   /*            101 0000; decode as 10 */
    { 0x0030, 7 },   /*            011 0000; decode as 11 */
    { 0x00A0, 8 },   /*           1010 0000; decode as 12 */
    { 0x0060, 8 },   /*           0110 0000; decode as 13 */
    { 0x00E0, 8 },   /*           1110 0000; decode as 14 */
    { 0x00C0, 9 },   /*         0 1100 0000; decode as 15 */
    { 0x01C0, 9 },   /*         1 1100 0000; decode as 16 */
    { 0x0020, 9 },   /*         0 0010 0000; decode as 17 */
    { 0x0380, 10 },  /*        11 1000 0000; decode as 18 */
    { 0x0040, 10 },  /*        00 0100 0000; decode as 19 */
    { 0x0240, 10 },  /*        10 0100 0000; decode as 20 */
    { 0x0140, 10 },  /*        01 0100 0000; decode as 21 */
    { 0x0480, 11 },  /*       100 1000 0000; decode as 22 */
    { 0x0280, 11 },  /*       010 1000 0000; decode as 23 */
    { 0x0680, 11 },  /*       110 1000 0000; decode as 24 */
    { 0x0180, 11 },  /*       001 1000 0000; decode as 25 */
    { 0x0580, 11 },  /*       101 1000 0000; decode as 26 */
    { 0x0900, 12 },  /*      1001 0000 0000; decode as 27 */
    { 0x0500, 12 },  /*      0101 0000 0000; decode as 28 */
    { 0x0D00, 12 },  /*      1101 0000 0000; decode as 29 */
    { 0x0300, 12 },  /*      0011 0000 0000; decode as 30 */
    { 0x0B00, 12 },  /*      1011 0000 0000; decode as 31 */
    { 0x0700, 12 },  /*      0111 0000 0000; decode as 32 */
    { 0x0F00, 12 },  /*      1111 0000 0000; decode as 33 */
    { 0x0080, 12 },  /*      0000 1000 0000; decode as 34 */
    { 0x0880, 12 },  /*      1000 1000 0000; decode as 35 */
    { 0x1200, 13 },  /*    1 0010 0000 0000; decode as 36 */
    { 0x0A00, 13 },  /*    0 1010 0000 0000; decode as 37 */
    { 0x1A00, 13 },  /*    1 1010 0000 0000; decode as 38 */
    { 0x0600, 13 },  /*    0 0110 0000 0000; decode as 39 */
    { 0x1600, 13 },  /*    1 0110 0000 0000; decode as 40 */
    { 0x0E00, 13 },  /*    0 1110 0000 0000; decode as 41 */
    { 0x1E00, 13 },  /*    1 1110 0000 0000; decode as 42 */
    { 0x0100, 13 },  /*    0 0001 0000 0000; decode as 43 */
    { 0x1100, 13 },  /*    1 0001 0000 0000; decode as 44 */
    { 0x3000, 14 },  /*   11 0000 0000 0000; decode as 45 */
    { 0x0800, 14 },  /*   00 1000 0000 0000; decode as 46 */
    { 0x2800, 14 },  /*   10 1000 0000 0000; decode as 47 */
    { 0x1800, 14 },  /*   01 1000 0000 0000; decode as 48 */
    { 0x3800, 14 },  /*   11 1000 0000 0000; decode as 49 */
    { 0x0400, 14 },  /*   00 0100 0000 0000; decode as 50 */
    { 0x2400, 14 },  /*   10 0100 0000 0000; decode as 51 */
    { 0x1400, 14 },  /*   01 0100 0000 0000; decode as 52 */
    { 0x3400, 14 },  /*   11 0100 0000 0000; decode as 53 */
    { 0x0C00, 14 },  /*   00 1100 0000 0000; decode as 54 */
    { 0x2C00, 14 },  /*   10 1100 0000 0000; decode as 55 */
    { 0x1C00, 14 },  /*   01 1100 0000 0000; decode as 56 */
    { 0x3C00, 14 },  /*   11 1100 0000 0000; decode as 57 */
    { 0x0200, 14 },  /*   00 0010 0000 0000; decode as 58 */
    { 0x0000, 15 },  /*  000 0000 0000 0000; decode as 59 */
    { 0x4000, 15 },  /*  100 0000 0000 0000; decode as 60 */
    { 0x2000, 15 },  /*  010 0000 0000 0000; decode as 61 */
    { 0x6000, 15 },  /*  110 0000 0000 0000; decode as 62 */
    { 0x1000, 15 },  /*  001 0000 0000 0000; decode as 63 */
    { 0x5000, 15 },  /*  101 0000 0000 0000; decode as 64 */
/* These are special codes. The codes that are prefix codes are followed
 * by a 6, 7, or 8 bit number giving the real distance. The numbers
 * following the prefixes are also bit-reversed.
 */
/* This is a prefix code for all lengths in [65..128]. A 6 bit code follows */
    { 0x0340, 10 },  /*           11 0100 0000; decode as 65 */
/* This is a prefix code for all lengths in [129..256]. A 7 bit code follows
 */
    { 0x0120, 9 },   /*          1 0010 0000; decode as 66 */
/* This is a prefix code for all lengths > 256. At least one 8 bit
 * code follows. If it's MS bit is 1, an 8 bit code follows. So long as
 * the MS bits of those nibbles are 1, there's another 8 bit code. The final
 * number is found by concatenating all the 7 + 7 + ... bit values. Note
 that
 * these values are also bit reversed in the accumulator but MS bit first
 * in the real data stream.
 */
    { 0x2200, 14 },  /*   10 0010 0000 0000; decode as 67 */
/* This is a code that signifies that the literal string goes to the
 * end of the coding line, whereever that is. It's especially useful
 * for encoding long strings.
 */
    { 0x0070, 7 }    /*            111 0000; decode as 68 */
};
```

APPENDIX A-continued

```
#endif /* _NEED_LITERAL_LENGTH_CODES_ */
/* Here are the codes for the equivalence class numbers. These are the
 * literal codes that follow a literal length.
 */
#ifdef _NEED_LITERAL_CODES_
/* REMEMBER, read these bits from right to left! */
static mmrTableEntry IdcLiteralCodes[47] =
{
    { 0x012, 5 },   /*           1 0010; decode as 0 */
    { 0x006, 4 },   /*              0110; decode as 1 */
    { 0x001, 3 },   /*               001; decode as 2 */
    { 0x005, 3 },   /*               101; decode as 3 */
    { 0x003, 3 },   /*               011; decode as 4 */
    { 0x00E, 4 },   /*              1110; decode as 5 */
    { 0x007, 3 },   /*               111; decode as 6 */
    { 0x00A, 5 },   /*             0 1010; decode as 7 */
    { 0x030, 7 },   /*           011 0000; decode as 8 */
    { 0x070, 7 },   /*           111 0000; decode as 9 */
    { 0x080, 8 },   /*          1000 0000; decode as 10 */
    { 0x008, 7 },   /*           000 1000; decode as 11 */
    { 0x048, 7 },   /*           100 1000; decode as 12 */
    { 0x040, 8 },   /*          0100 0000; decode as 13 */
    { 0x0C0, 8 },   /*          1100 0000; decode as 14 */
    { 0x028, 7 },   /*           010 1000; decode as 15 */
    { 0x068, 7 },   /*           110 1000; decode as 16 */
    { 0x02C, 6 },   /*            10 1100; decode as 17 */
    { 0x01C, 6 },   /*            01 1100; decode as 18 */
    { 0x020, 8 },   /*          0010 0000; decode as 19 */
    { 0x0A0, 8 },   /*          1010 0000; decode as 20 */
    { 0x000, 9 },   /*         0 0000 0000; decode as 21 */
    { 0x018, 7 },   /*           001 1000; decode as 22 */
    { 0x060, 8 },   /*          0110 0000; decode as 23 */
    { 0x0E0, 8 },   /*          1110 0000; decode as 24 */
    { 0x010, 8 },   /*          0001 0000; decode as 25 */
    { 0x090, 8 },   /*          1001 0000; decode as 26 */
    { 0x058, 7 },   /*           101 1000; decode as 27 */
    { 0x03C, 6 },   /*            11 1100; decode as 28 */
    { 0x038, 7 },   /*           011 1000; decode as 29 */
    { 0x078, 7 },   /*           111 1000; decode as 30 */
    { 0x01A, 5 },   /*             1 1010; decode as 31 */
    { 0x004, 7 },   /*           000 0100; decode as 32 */
    { 0x100, 9 },   /*         1 0000 0000; decode as 33 */
    { 0x044, 7 },   /*           100 0100; decode as 34 */
    { 0x024, 7 },   /*           010 0100; decode as 35 */
    { 0x050, 8 },   /*          0101 0000; decode as 36 */
    { 0x0D0, 8 },   /*          1101 0000; decode as 37 */
    { 0x064, 7 },   /*           110 0100; decode as 38 */
    { 0x014, 7 },   /*           001 0100; decode as 39 */
    { 0x002, 6 },   /*            00 0010; decode as 40 */
    { 0x054, 7 },   /*           101 0100; decode as 41 */
    { 0x034, 7 },   /*           011 0100; decode as 42 */
    { 0x074, 7 },   /*           111 0100; decode as 43 */
    { 0x022, 6 },   /*            10 0010; decode as 44 */
    { 0x00C, 7 },   /*           000 1100; decode as 45 */
    { 0x04C, 7 },   /*           100 1100; decode as 46 */
};
#endif/* _NEED_LITERAL_CODES_ */
/* These are the codes used to encode lengths of strings that are
 * copied directly from the reference line to the coding line
 * immediately below (no offset).
 */
/* These are the indices into the encoding table for special codes
 * (see table definition below).
 */
#define cLDShortCopyLength 63
#define cLDMediumCopyLength 127
#define cLDLongCopyLength 255
#define cLDMediumCopyLengthBits 6
#define cLDLongCopyLengthBits 7
#define cLDVeryLongCopyLengthBits 8
#define cLDMediumCopyLenPrefix 64
#define cLDLongCopyLenPrefix 65
#define cLDVeryLongCopyLenPrefix 66
#define cLDCopyLenToEOL 67
#define cLDCopyLenToMarker0M1 68
#define cLDCopyLenToMarker0 69
#define cLDCopyLenToMarker0P1 70
#define cLDCopyLenToMarker1 71
#ifdef _NEED_STRING_LENGTH_CODES_
/* REMEMBER, read these bits from right to left! */
static mmrTableEntry IdcStringLengthCodes[72] =
{
    { 0x0038, 6 },  /*               11 1000; decode as 0 */
    { 0x0001, 2 },  /*                   01; decode as 1 */
    { 0x000C, 4 },  /*                 1100; decode as 2 */
    { 0x0014, 5 },  /*                1 0100; decode as 3 */
    { 0x0004, 6 },  /*               00 0100; decode as 4 */
    { 0x0024, 6 },  /*               10 0100; decode as 5 */
    { 0x0008, 7 },  /*              000 1000; decode as 6 */
    { 0x0048, 7 },  /*              100 1000; decode as 7 */
    { 0x0028, 7 },  /*              010 1000; decode as 8 */
    { 0x0068, 7 },  /*              110 1000; decode as 9 */
    { 0x0018, 7 },  /*              001 1000; decode as 10 */
    { 0x00D0, 8 },  /*             1101 0000; decode as 11 */
    { 0x0030, 8 },  /*             0011 0000; decode as 12 */
    { 0x00B0, 8 },  /*             1011 0000; decode as 13 */
    { 0x0070, 8 },  /*             0111 0000; decode as 14 */
    { 0x01A0, 9 },  /*            1 1010 0000; decode as 15 */
    { 0x0060, 9 },  /*            0 0110 0000; decode as 16 */
    { 0x0160, 9 },  /*            1 0110 0000; decode as 17 */
    { 0x00E0, 9 },  /*            0 1110 0000; decode as 18 */
    { 0x01E0, 9 },  /*            1 1110 0000; decode as 19 */
    { 0x0010, 9 },  /*            0 0001 0000; decode as 20 */
    { 0x0110, 9 },  /*            1 0001 0000; decode as 21 */
    { 0x0090, 9 },  /*            0 1001 0000; decode as 22 */
    { 0x0190, 9 },  /*            1 1001 0000; decode as 23 */
    { 0x0050, 9 },  /*            0 0101 0000; decode as 24 */
    { 0x0340, 10 }, /*           11 0100 0000; decode as 25 */
    { 0x00C0, 10 }, /*           00 1100 0000; decode as 26 */
    { 0x02C0, 10 }, /*           10 1100 0000; decode as 27 */
    { 0x01C0, 10 }, /*           01 1100 0000; decode as 28 */
    { 0x03C0, 10 }, /*           11 1100 0000; decode as 29 */
    { 0x0020, 10 }, /*           00 0010 0000; decode as 30 */
    { 0x0220, 10 }, /*           10 0010 0000; decode as 31 */
    { 0x0120, 10 }, /*           01 0010 0000; decode as 32 */
    { 0x0320, 10 }, /*           11 0010 0000; decode as 33 */
    { 0x00A0, 10 }, /*           00 1010 0000; decode as 34 */
    { 0x02A0, 10 }, /*           10 1010 0000; decode as 35 */
    { 0x0300, 11 }, /*          011 0000 0000; decode as 36 */
    { 0x0700, 11 }, /*          111 0000 0000; decode as 37 */
    { 0x0080, 11 }, /*          000 1000 0000; decode as 38 */
    { 0x0480, 11 }, /*          100 1000 0000; decode as 39 */
    { 0x0280, 11 }, /*          010 1000 0000; decode as 40 */
    { 0x0680, 11 }, /*          110 1000 0000; decode as 41 */
    { 0x0180, 11 }, /*          001 1000 0000; decode as 42 */
    { 0x0580, 11 }, /*          101 1000 0000; decode as 43 */
    { 0x0380, 11 }, /*          011 1000 0000; decode as 44 */
    { 0x0780, 11 }, /*          111 1000 0000; decode as 45 */
    { 0x0040, 11 }, /*          000 0100 0000; decode as 46 */
    { 0x0440, 11 }, /*          100 0100 0000; decode as 47 */
    { 0x0240, 11 }, /*          010 0100 0000; decode as 48 */
    { 0x0640, 11 }, /*          110 0100 0000; decode as 49 */
    { 0x0140, 11 }, /*          001 0100 0000; decode as 50 */
    { 0x0540, 11 }, /*          101 0100 0000; decode as 51 */
    { 0x0800, 12 }, /*         1000 0000 0000; decode as 52 */
    { 0x0400, 12 }, /*         0100 0000 0000; decode as 53 */
    { 0x0C00, 12 }, /*         1100 0000 0000; decode as 54 */
    { 0x0200, 12 }, /*         0010 0000 0000; decode as 55 */
    { 0x0A00, 12 }, /*         1010 0000 0000; decode as 56 */
    { 0x0600, 12 }, /*         0110 0000 0000; decode as 57 */
    { 0x0E00, 12 }, /*         1110 0000 0000; decode as 58 */
    { 0x0100, 12 }, /*         0001 0000 0000; decode as 59 */
    { 0x0900, 12 }, /*         1001 0000 0000; decode as 60 */
    { 0x0500, 12 }, /*         0101 0000 0000; decode as 61 */
    { 0x0D00, 12 }, /*         1101 0000 0000; decode as 62 */
    { 0x0000, 13 }, /*        0 0000 0000 0000; decode as 63 */
/* Special Prefix codes. */
/* These are special codes. The codes that are prefix codes are followed
 * by a 6, 7, or 8 bit number giving the real distance. The numbers
 * following the prefixes are also bit-reversed.
 */
/* This is a prefix code for all lengths in [64..127]. A 6 bit code follows */
    { 0x0058, 7 },  /*              101 1000; decode as 64 */
/* This is a prefix code for all lengths in [128..255]. A 7 bit code follows
 */
    { 0x0150, 9 },  /*            1 0101 0000; decode as 65 */
/* This is a prefix code for all lengths > 256. At least one 8 bit
 * code follows. If it's MS bit is 1, an 8 bit code follows. So long as
```

APPENDIX A-continued

```
* the MS bits of those nibbles are 1, there's another 8 bit code. The final
* number is found by concatenating all the 7 + 7 + ... bit values. Note
that
* these values are also bit reversed in the accumulator but MS bit first
* in the real data stream.
*/
    { 0x1000, 13 },    /*   1 0000 0000 0000; decode as 66 */
/* This is a code that signifies that the copied string goes to the
* end of the coding line, whereever that is. It's especially useful
* for encoding long strings.
*/
    { 0x00F0, 8 },     /*             1111 0000; decode as 67 */
/* This is the code that says the literal string ends at the next key point
* minus 1. Key points are defined by the ends of strings of copied
* bytes in the reference line.
*/
    { 0x0006, 3 },     /*                   110; decode as 68 */
/* This is the code that says the literal string ends at the next key point
* exactly.
*/
    { 0x0003, 2 },     /*                    11; decode as 69 */
/* This is the code that says the literal string ends at the next key point
* plus 1.
*/
    { 0x0002, 4 },     /*                  0010; decode as 70 */
/* This is the code that says the literal string ends at the second key point
* exactly.
*/
    { 0x000A, 4 }      /*                  1010; decode as 71 */
};
#endif/* _NEED_STRING_LENGTH_CODES_ */
```

What is claimed is:

1. A method for processing a binary representation of a dithered image (dithered image) so that it may be compressed without losing essential information, said method comprising the steps of:

a) defining a plurality of equivalence classes for tiles of multi-pixel binary data contained in said dithered image, wherein tiles are of a predetermined organization of binary data, each of said equivalence classes further having defined and associated therewith a plurality of rendering exemplars having the same gray level;

b) identifying one equivalence class for each tile in said dithered image;

c) encoding each of said equivalence classes into an alternating sequence of literal elements and copy elements, said literal elements containing equivalence class information for one or more consecutive tiles and said copy elements containing information for copying previously encoded equivalence class information.

2. The method as recited by claim 1 wherein said step of defining a plurality of equivalence classes for tiles of said multi-pixel binary data is further comprised of the substep of defining equivalence classes so that each member of a class has the same gray level.

3. The method as recited in claim 2 wherein said predetermined organization of multi-pixel binary data of said tiles is a 1 pixel by 8 pixels.

4. The method as recited in claim 1 further comprising the steps of:

d) decoding said sequences of literal elements and copy elements back into their corresponding equivalence classes;

e) reconstructing said dithered image by selecting one of said plurality of rendering exemplars for each instance of an equivalence class.

5. The method as recited in claim 4 wherein said step of reconstructing said dithered image by selecting one of said plurality of rendering exemplars for each instance of an equivalence class is performed by selecting a rendering exemplar based on a spatial location in said dithered image for the instance of an equivalence class.

6. The method as recited in claim 5 wherein said spatial location is the scanline of said instance of an equivalence class.

7. A method for compressing a binary representation of a dithered image (dithered image) comprising the steps of:

a) defining a plurality of equivalence classes for tiles of binary data contained in said dithered image, wherein tiles are of a predetermined organization of multi-pixel binary data, each of said equivalence classes further having defined and associated therewith a plurality of rendering exemplars having the same gray level;

b) extracting a tile from said dithered image;

c) determining which of said plurality of equivalence classes said tile is to be placed in;

d) storing an identifier for said determined equivalence class in an equivalence class memory;

e) repeating steps b)–d) for a second predetermined organization of multi-pixel binary data;

f) compressing said equivalence classes generated pursuant to step e) using a suitable compression technique.

8. The method as recited in claim 7 wherein said step of defining a plurality of equivalence classes for tiles of multi-pixel binary encoded data contained in said binary encoded image is further comprised of the steps of defining equivalence classes so that each member of a class has the same number of pixels in a first binary state.

9. The method as recited in claim 8 wherein said step of defining a plurality of equivalence classes for tiles of multi-pixel binary data contained in said dithered image is further comprised of the step of defining equivalence classes so that critical image information is not lost on decompression.

10. The method as recited in claim 7 wherein for said step of compressing said equivalence classes generated pursuant to step e) using a suitable compression technique, said suitable compression technique uses Huffman Coding to code compression elements.

11. The method as recited in claim 7 wherein said second predetermined organization of multi-pixel binary data is a scanline of said dithered image.

12. The method as recited in claim 11 wherein for said step of compressing said equivalence classes generated pursuant to step e) using a suitable compression technique, said compression scheme is comprised of the steps of:

processing each scanline of tiles by comparing to the immediately previously processed scanline of tiles;

finding sequences of tiles in a scanline of tiles wherein the corresponding tile in the immediately previously processed scanline of tiles are in the same equivalence class;

c3) coding said sequences using a first Huffman coding scheme;

c4) for tiles wherein the corresponding tile in the immediately previously processed scanline of tiles is not in the same equivalence class, coding said tiles in sequences of tiles in the same equivalence class using a second Huffman coding scheme.

13. The method as recited in claim 7 wherein the dimensions of a tile are 1 pixel high by 8 pixels wide.

14. The method as recited in claim 7 further comprising the step of defining a set of rendering exemplars for each equivalence class so that upon decompression, a randomly selected rendering exemplar may be used to represent an instance of equivalence class.

15. A method for decompressing a compressed binary representation of a dithered image, said dithered image organized into a plurality of tiles representing multiple pixels, said method comprising the steps of:
  a) decoding said compressed binary representation into a plurality of literal elements and copy elements;
  b) decoding each of said literal elements and copy elements into equivalence class identifiers, each equivalence class identifier corresponding to a tile of said dithered image;
  c) selecting an equivalence class exemplar from a rendering dictionary for each equivalence class identifier, said rendering dictionary comprised of a plurality of representative tile configurations for said class.

16. The method as recited in claim 15 wherein said step of selecting an equivalence class exemplar from a rendering dictionary for each equivalence class identifier is further comprised of the step of selecting said rendering exemplar based on the spatial position of the equivalence class identifier in said dithered image.

17. The method as recited in claim 16 wherein said spatial position is a scanline.

18. A system for compression and decompression of dithered images, said system comprising:
  input means for receiving a dithered image;
  a processor for performing operations for compressing said dithered image and decompressing a compressed representation of said dithered image;
  storage means for storing tile equivalence class definitions, each of said tile equivalence class definitions for categorizing a plurality of tile configurations into a single class;
  said storage means further for storing data including operations for compressing said dithered image, said operations including:
  operations for creating a binary representation of said dithered image;
  operations for extracting tiles from said binary representation and determining the equivalence class for a tile;
  operations for compressing a predetermined collection of tiles based on their determined equivalence class creating an alternating sequence of literal elements and copy elements;
  said storage means further for storing equivalence class exemplars, each of said equivalence class exemplars comprising a plurality of representative tile configurations for said class, each of said tile configurations have the same gray level;
  said storage means further for storing data including operations for decompressing a compressed representation of a dithered image including:
  operations for decompressing sequences of literal and copy elements into instances of equivalence classes;
  operations for selecting one of said plurality of representative tile configurations for an instance of an equivalence class.

19. A system for compressing and decompressing a binary representation of a dithered image comprising:
  first storage means for storing equivalence class definitions, each of said equivalence class definitions for assigning an equivalence class identifier to a tile, said tile being a logical organization of binary data in said dithered image;
  equivalence class identification means for identifying the equivalence class for a tile;
  encoding means for encoding sets of tiles based on their identified equivalence class into a compressed data stream;
  second storage means for storing a rendering dictionary, said rendering dictionary having one or more rendering exemplars for each equivalence class;
  decoding means for decoding an instance of said compressed data stream into a sequence of equivalence class identifiers; and
  rendering means coupled to said second storage means, said rendering means for selecting a rendering exemplar for an instance of an equivalence class identifier and outputting a decompressed binary representation of said dithered image wherein critical viewing information is retained.

\* \* \* \* \*